(12) United States Patent
Chen et al.

(10) Patent No.: US 8,275,832 B2
(45) Date of Patent: Sep. 25, 2012

(54) METHOD TO ENABLE USER SELECTION OF SEGMENTS IN AN INSTANT MESSAGING APPLICATION FOR INTEGRATION IN OTHER APPLICATIONS

(75) Inventors: Yen-Fu Chen, Austin, TX (US); John Hans Handy-Bosma, Cedar Park, TX (US); Mei Yang Selvage, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 11/039,508

(22) Filed: Jan. 20, 2005

(65) Prior Publication Data

US 2006/0161852 A1    Jul. 20, 2006

(51) Int. Cl.
*G06F 15/16* (2006.01)
*G06F 3/00* (2006.01)

(52) U.S. Cl. ......... 709/204; 709/205; 715/758; 715/744

(58) Field of Classification Search .................. 709/204, 709/205; 715/758, 744; 719/328, 329
See application file for complete search history.

(56) References Cited

U.S. PATENT DOCUMENTS

| | | | | |
|---|---|---|---|---|
| 5,339,388 A * | 8/1994 | Bates et al. | .................. | 715/742 |
| 5,615,296 A | 3/1997 | Stanford et al. | | |
| 5,777,615 A * | 7/1998 | Barber et al. | ................. | 715/856 |
| 6,076,100 A | 6/2000 | Cottrille et al. | | |
| 6,199,070 B1 | 3/2001 | Polo-Wood et al. | | |
| 6,301,609 B1 * | 10/2001 | Aravamudan et al. | ........ | 709/207 |
| 6,324,569 B1 | 11/2001 | Ogilvie et al. | | |
| 6,393,460 B1 * | 5/2002 | Gruen et al. | .................. | 709/204 |
| 6,487,583 B1 * | 11/2002 | Harvey et al. | ................. | 709/204 |
| 6,532,218 B1 | 3/2003 | Shaffer et al. | | |
| 6,587,127 B1 * | 7/2003 | Leeke et al. | .................. | 715/765 |
| 6,631,412 B1 | 10/2003 | Glasser et al. | | |
| 6,651,086 B1 | 11/2003 | Manber et al. | ................ | 709/205 |

(Continued)

OTHER PUBLICATIONS

USPTO Office action for U.S. Appl. No. 11/032,884 dated Dec. 2, 2008.

(Continued)

*Primary Examiner* — Peter-Anthony Pappas
*Assistant Examiner* — Umar Cheema
(74) *Attorney, Agent, or Firm* — Yee & Associates, P.C.; Mark C. Vallone

(57) ABSTRACT

A Segment Interface Program (SIP) is disclosed that enables a user to choose locations in other applications to receive segments, and to mark segments for manual or automatic transmission to those applications. The SIP comprises an Application Interface Program (AIP), a Segment Creator Program (SCP), a Segment Queue Program (SQP), and a Segment Delivery Program (SDP). The SIP accesses a Rules database, a codes database, and a queue database. The AIP enables a user to select a location in an application and assign an application code and a location code to the location. The SCP enables a user to select a segment in a chat transcript, assign an application code and a location code to the segment, and send the segment to the SQP. The SQP receives the segment, assigns a queue number, and places the segment in a queue table. The SDP reads the user code, the application code and, when the application is active, sends the segment to the location in the application with the corresponding code. A single segment may be inserted into an application in multiple locations by creating additional codes for multiple instances of a location.

9 Claims, 5 Drawing Sheets

U.S. PATENT DOCUMENTS

| | | | |
|---|---|---|---|
| 6,718,518 B1 * | 4/2004 | Plow et al. .................. 715/205 | |
| 6,757,365 B1 | 6/2004 | Bogard | |
| 6,760,749 B1 | 7/2004 | Dunlap et al. | |
| 7,034,691 B1 | 4/2006 | Rapaport et al. | |
| 7,080,139 B1 | 7/2006 | Briggs et al. | |
| 7,111,044 B2 * | 9/2006 | Lee .............................. 709/204 | |
| 7,177,817 B1 | 2/2007 | Khosla et al. | |
| 7,188,143 B2 * | 3/2007 | Szeto ........................... 709/206 | |
| 7,191,400 B1 | 3/2007 | Buvac et al. | |
| 7,263,526 B1 | 8/2007 | Busey et al. | |
| 7,269,794 B2 * | 9/2007 | Martinez et al. ............. 715/758 | |
| 7,328,214 B2 | 2/2008 | Yuan et al. | |
| 7,698,660 B2 * | 4/2010 | Sanchez et al. ............. 715/863 | |
| 2002/0035605 A1 | 3/2002 | McDowell et al. .......... 709/206 | |
| 2002/0059566 A1 | 5/2002 | Delcambre et al. | |
| 2002/0062347 A1 * | 5/2002 | Low et al. .................... 709/204 | |
| 2002/0069249 A1 | 6/2002 | Pedersen | |
| 2002/0112004 A1 | 8/2002 | Reid et al. | |
| 2002/0120939 A1 | 8/2002 | Wall et al. | |
| 2002/0178163 A1 | 11/2002 | Mayer ............................ 707/10 | |
| 2002/0188681 A1 * | 12/2002 | Gruen et al. .................. 709/204 | |
| 2002/0188777 A1 | 12/2002 | Kraft et al. | |
| 2003/0014488 A1 | 1/2003 | Dalal et al. | |
| 2003/0023684 A1 | 1/2003 | Brown et al. | |
| 2003/0034999 A1 | 2/2003 | Coughlin et al. | |
| 2003/0208639 A1 | 11/2003 | Stern et al. | |
| 2003/0229722 A1 | 12/2003 | Beyda | |
| 2003/0233420 A1 | 12/2003 | Stark et al. | |
| 2004/0002049 A1 | 1/2004 | Beavers et al. | |
| 2004/0037406 A1 | 2/2004 | Gourraud ................. 379/202.01 | |
| 2004/0127241 A1 | 7/2004 | Shostak | |
| 2004/0174863 A1 | 9/2004 | Caspi et al. | |
| 2004/0174896 A1 | 9/2004 | Caspi et al. | |
| 2004/0174905 A1 | 9/2004 | Caspi et al. | |
| 2004/0175096 A1 | 9/2004 | Caspi et al. | |
| 2004/0175097 A1 | 9/2004 | Caspi et al. | |
| 2004/0177371 A1 | 9/2004 | Caspi et al. | |
| 2004/0177375 A1 | 9/2004 | Caspi et al. | |
| 2004/0177376 A1 | 9/2004 | Caspi et al. | |
| 2004/0196306 A1 * | 10/2004 | Manto et al. ................. 345/700 | |
| 2004/0215731 A1 | 10/2004 | Tzann-en Szeto | |
| 2004/0224772 A1 | 11/2004 | Canessa et al. | |
| 2004/0243922 A1 | 12/2004 | Sirota et al. | |
| 2004/0249650 A1 | 12/2004 | Freedman et al. | |
| 2004/0260710 A1 | 12/2004 | Marston et al. | |
| 2005/0021624 A1 * | 1/2005 | Herf et al. ..................... 709/204 | |
| 2005/0024387 A1 | 2/2005 | Ratnakdar et al. | |
| 2005/0034079 A1 * | 2/2005 | Gunasekar et al. ........... 715/753 | |
| 2005/0037739 A1 | 2/2005 | Zhong | |
| 2005/0097470 A1 | 5/2005 | Dias et al. | |
| 2005/0102361 A1 | 5/2005 | Winjum et al. | |
| 2005/0108332 A1 | 5/2005 | Vaschillo et al. | |
| 2005/0164154 A1 | 7/2005 | Solomon | |
| 2005/0234883 A1 | 10/2005 | Szeto et al. | |
| 2005/0234885 A1 * | 10/2005 | Szeto et al. ........................ 707/3 | |
| 2005/0262199 A1 | 11/2005 | Chen et al. | |
| 2005/0289220 A1 * | 12/2005 | Chen et al. .................... 709/206 | |
| 2006/0004702 A1 | 1/2006 | St. John et al. | |
| 2006/0041828 A1 | 2/2006 | King et al. | |
| 2006/0047635 A1 | 3/2006 | Kraenzel et al. | |
| 2006/0074727 A1 | 4/2006 | Briere | |
| 2006/0161631 A1 * | 7/2006 | Lira ............................... 709/206 | |
| 2006/0167994 A1 | 7/2006 | Chen et al. | |
| 2006/0277474 A1 | 12/2006 | Robarts et al. | |
| 2007/0027954 A1 | 2/2007 | Chen et al. | |
| 2009/0019377 A1 | 1/2009 | Chen et al. | |
| 2009/0030984 A1 | 1/2009 | Chen et al. | |

OTHER PUBLICATIONS

USPTO Office action for U.S. Appl. No. 11/032,884 dated Apr. 30, 2009.

USPTO Office action for U.S. Appl. No. 10/875,881 dated Sep. 26, 2008.

USPTO Notice of allowance for U.S. Appl. No. 10/875,881 dated Dec. 31, 2008.

USPTO office action for U.S. Appl. No. 10/824,811 dated Sep. 3, 2008.

USPTO office action for U.S. Appl. No. 10/824,811 dated Mar. 17, 2009.

USPTO office action for U.S. Appl. No. 10/824,811 dated Aug. 21, 2009.

USPTO office action for U.S. Appl. No. 12/177,277 dated May 28, 2010.

USPTO office action for U.S. Appl. No. 12/177,270 dated May 21, 2010.

* cited by examiner

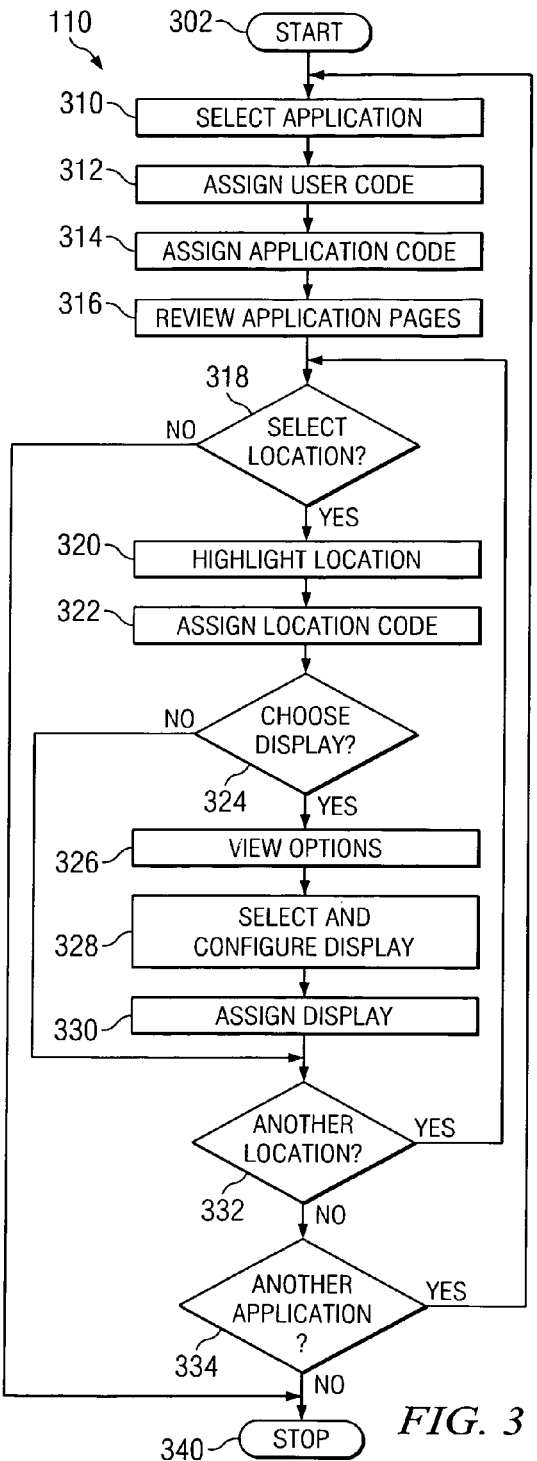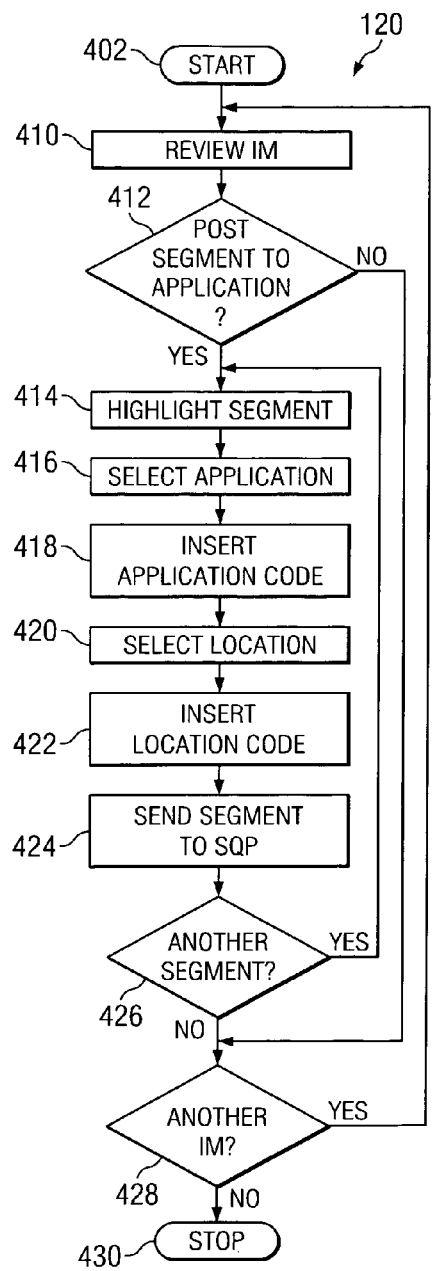
FIG. 3
FIG. 4

800

| APPLICATION 1 | 11 |
|---|---|
| APPLICATION 2 | 22 |
| APPLICATION 3 | 33 |

820  810

| LOCATION 1 | 01 |
|---|---|
| LOCATION 2 | 02 |
| LOCATION 3 | 03 |
| LOCATION 4 | 04 |
| LOCATION 5 | 05 |

| USER A | | 842 |
|---|---|---|
| APPLICATION 1 | LOCATION 1 | INSTANCE 1 |
| APPLICATION 1 | LOCATION 1 | INSTANCE 2 |
| APPLICATION 1 | LOCATION 1 | INSTANCE 3 |
| APPLICATION 1 | LOCATION 2 | INSTANCE 1 |
| APPLICATION 1 | LOCATION 2 | INSTANCE 2 |
| APPLICATION 2 | LOCATION 4 | INSTANCE 1 |
| APPLICATION 2 | LOCATION 4 | INSTANCE 2 |
| APPLICATION 3 | LOCATION 3 | INSTANCE 1 |
| APPLICATION 3 | LOCATION 5 | INSTANCE 1 |
| APPLICATION 3 | LOCATION 5 | INSTANCE 2 |

*FIG. 8B*

| 910 SEQUENCE | 920 USER | 930 APPLICATION | 940 LOCATION | 950 TEXT |
|---|---|---|---|---|
| 1 | 03 | 11 | 05 | AAA |
| 2 | 01 | 11 | 01 | BBB |
| 3 | 02 | 22 | 04 | CCC |
| 4 | 02 | 11 | 03 | DDD |
| 5 | 01 | 33 | 01 | EEE |
| 6 | 01 | 22 | 02 | FFF |
| 7 | 03 | 11 | 02 | GGG |
| 8 | 01 | 33 | 02 | HHH |
| 9 | 03 | 22 | 04 | III |
| 10 | 03 | 22 | 03 | JJJ |
| 11 | 02 | 11 | 01 | KKK |
| 12 | 01 | 22 | 02 | LLL |

METHOD TO ENABLE USER SELECTION OF SEGMENTS IN AN INSTANT MESSAGING APPLICATION FOR INTEGRATION IN OTHER APPLICATIONS

CROSS-REFERENCE TO RELATED APPLICATION

The present invention is related to the subject matter of U.S. patent application Ser. No. 10/875,881, and U.S. patent application Ser. No. 11/032,884 incorporated herein by reference.

FIELD OF THE INVENTION

The present invention is a process for using electrical computers or data processing machines to enable manual selection of instant message segments and automatic integration of the segments with other applications.

BACKGROUND OF THE INVENTION

Demand-based messaging is a communication service that allows users to exchange message data, such as text, over a network or other communications media, in real time. Probably the most common medium for exchange is the Internet, but as wireless phone networks continue to expand, their popularity for text messaging is also expanding. For example, U.S. Pat. No. 6,301,609 and United States Patent Application Publication No. 2002/0035605 illustrate the move toward an exchange medium that unifies traditional and wireless communications. Instant messaging (IM) is perhaps the most widely known and used embodiment of demand-based messaging. Today, most network and online service providers offer some form of IM service. IM sessions (colloquially referred to as "chats") are often lengthy, with multiple participants each taking many turns "speaking" in the chat window.

IM users typically use a networked computer and IM client software to exchange messages with one another in conversational style. An IM client provides an interface for users to compose, send, receive, and read text messages. Examples of IM clients that are popular today include IBM's SameTime, MSN Messenger, and Yahoo/AOL Instant Messenger. Web-based interfaces are also gaining popularity, as illustrated in U.S. Pat. No. 6,651,086 issued to Manber et al., which describes how a user can join conversations about topics that are presented as web content.

In a graphical display, an IM client usually includes at least two windows: one window for composing and sending messages, and another window for displaying messages as users take turns sending and receiving them. It is common for one user to have multiple IM chats running simultaneously, usually in separate windows. Chats may include simple information shared by two workers scheduling a meeting, or they may contain complex discussions regarding proprietary information and critical decisions that keep a project moving forward. Chats also may contain a high degree of historical data and proprietary knowledge that is useful not only to the participants, but to other people within the organization that did not participate in the chat.

Chat transcripts frequently reveal that users spend at least some portion of a chat trying to locate specific statements already made in the current chat, or perhaps in a prior chat. Alternatively, IM users may engage simultaneously in a chat and a phone conversation, and the phone conversation may turn to locating and sharing chat information. U.S. Patent Application No. 2004/0037406, for example, discloses a method and system for distributing instant messages to conference call participants. IM users often need to refer back to information that they have sent already in one or more prior messages. Just as often, IM users need to share that information with other users (perhaps in other chats).

Current IM users must scroll through chat windows (which may be hundreds of lines long) or use the IM client's limited search capability to find specific information. Either of these techniques for locating specific information can prove difficult, cumbersome, and time-consuming.

One solution to the problems associated with sharing chat information involves enabling an IM user to mark a specific location within an instant message, share the message mark with another user, and synchronize a chat window with the message mark. U.S. patent application Ser. No. 10/875,881 (the '881 application) disclosed a solution involving a message composer program that configured each computer to accept message data, including markers and links, from a user. A marker identified a specific location within message data, and a link referred to a specific marker within a message. A message transport program configured each computer to send message data over the communications media to other computers, and to receive message data sent by other computers over the communication media. A message reader program configured each computer to display message data, including markers and links, as the message transport program receives it. The preferred embodiment of the message reader program further configured each computer to accept a request from a user to synchronize the display with a marker, and to respond to such a request by displaying the marker and surrounding message data.

The '881 application further disclosed an alternative embodiment that integrated message markers and message links with other conventional applications, including without limitation email clients, word processors, spreadsheet programs, file viewers, or web browsers. In such embodiments, the message composer program configured a computer to accept message links from a user and then to insert the links into application data, rather than message data. Thus, when a user activated a message link within the application, the message reader program opened a new graphical user interface (GUI) to the message composer program and synchronized the display window with the corresponding message marker.

U.S. patent application Ser. No. 11/032,884 disclosed a system and method for automatically segmenting content from an IM transcript, recognizing commands within the segments, and sending instructions associated with the commands to a computer to send the segment to an application. The system comprised the IM messaging programs, a segment finding program, a command finding program, and a command list. Words in the segment were recognized as commands and a computer executed instructions in response to the recognition of the command.

Although solutions have been presented to marking chat segments for distribution and storage, a further need exists for a method by which a user may select information to be posted to other applications, and to configure an application to receive the selected information in appropriately selected locations. In addition, a need exists for one or more graphical user interfaces that will allow a user to perform the foregoing tasks.

SUMMARY OF THE INVENTION

The invention that meets the needs identified above is a Segment Interface Program (SIP) that enables a user to choose locations in other applications to receive segments, and to mark segments for manual or automatic transmission to those applications. The SIP comprises an Application Interface Program (AIP), a Segment Creator Program (SCP), a Segment Queue Program (SQP), and a Segment Delivery Program (SDP). The SIP accesses a Rules database, a codes database, and a queue database. The AIP enables a user to select a location in an application and assign a user code, an application code, and a location code to the location. The SCP enables a user to select a segment in a chat transcript, assign a user code, an application code and a location code to the segment, and send the segment to the SQP. The SQP receives the segment, assigns a queue number, and places the segment in a queue table. The SDP reads the user code, the application code and, when the application is active, sends the segment to the location in the application with the corresponding code. A single segment may be inserted into an application in multiple locations by creating additional codes for multiple instances of a location.

The SIP uses two graphical user interfaces. The first graphical user interface enables the user to select a location within an application and apply a user code, application code and location code to the location. The second graphical user interface enables a user to select a segment from a chat transcript, and apply a user code, application code, and location code to the segment for transmission to the SQP. Types of space that may be designated in an application display are associated with a corresponding set of rules in a rules database. A rules database contains instructions for inserting a chat segment with attached codes into a space in an application display associated with a corresponding set of codes. A code table stores the codes for various applications and location types in a codes database. A user table stores all instances of locations for each application a user places in the system. A queue table stores all chat segments with user, application, and location codes attached in the order of the assigned queue numbers.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 provides a flowchart of the Application Interface Program (AIP);

FIG. 4 provides a flowchart of the Segment Creator Program (SCP);

FIG. 8 illustrates a code table; and

FIG. 9 illustrates a queue table.

DETAILED DESCRIPTION OF THE PREFERRED EMBODIMENT

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention. As used herein, the term "computer" includes, without limitation, any machine that is capable of processing data and performing logic operations according to a predefined set of instructions. As used herein, the terms "to highlight" or "highlighting" mean to select a chat segment or a location in an application display, and includes without limitation marking the selected portion of the chat transcript with a color overlay, a shaded overlay using a gray scale, underlining, italicizing, bolding, changing the font, bracketing, and any other method of marking a section of text known to persons skilled in the art. As used herein, the term "instance" means one of a plurality of selected locations within an application display wherein each segment has the same segment inserted in accordance with the Segment Interface Program. As used herein, the term "location type" means a configurable space in an application display where a designated chat segment may be inserted according to rules configured for the particular type of location. As used herein, the term "memory" includes, without limitation, volatile memory and storage and non-volatile memory and storage. As used herein, the term "select" means to identify a segment using a graphical user interface, and to declare that segment for further action. As used herein, the term "rules" means a set of instructions for inserting a chat segment with attached codes into a designated space in an application display having a corresponding set of codes.

Figure 1:
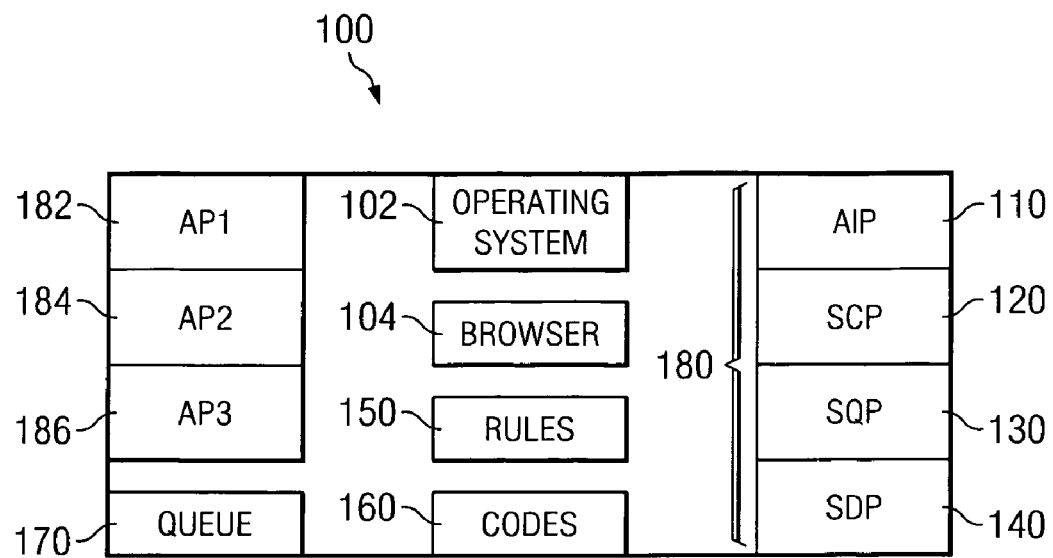
FIG. 1 illustrates the internal configuration of a computer having the computer program of the present invention loaded into memory.

The internal configuration of a computer, including connection and orientation of the processor, memory, and input/output devices, is well known in the art. FIG. 1 represents the internal configuration of a computer having the computer program of the present invention loaded into memory 100. The computer program of the present invention, called Segment Interface Program (180), comprises Application Interface Program (AIP) 110, Segment Creator Program (SCP) 120, Segment Queue Program (SQP) 130, and Segment Delivery Program (SDP) 140. During operation, SIP 180 accesses Rules database 150, codes database 160, and queue database 170. Memory 100 may also contain an operating system 102 and a browser 104. Memory 100 is shown having three representative applications, AP1 182, AP2 184 and AP3 186.

In alternative embodiments, SIP 180 and its components can be stored in the memory of other computers or in storage devices connected to one or more computers. Storing SIP 180 in the memory or storage devices of other computers allows the processor workload to be distributed across a plurality of processors instead of a single processor. Further configurations of SIP 180 across various multiple memories, storage devices and processors are known by persons skilled in the art.

Figure 2:
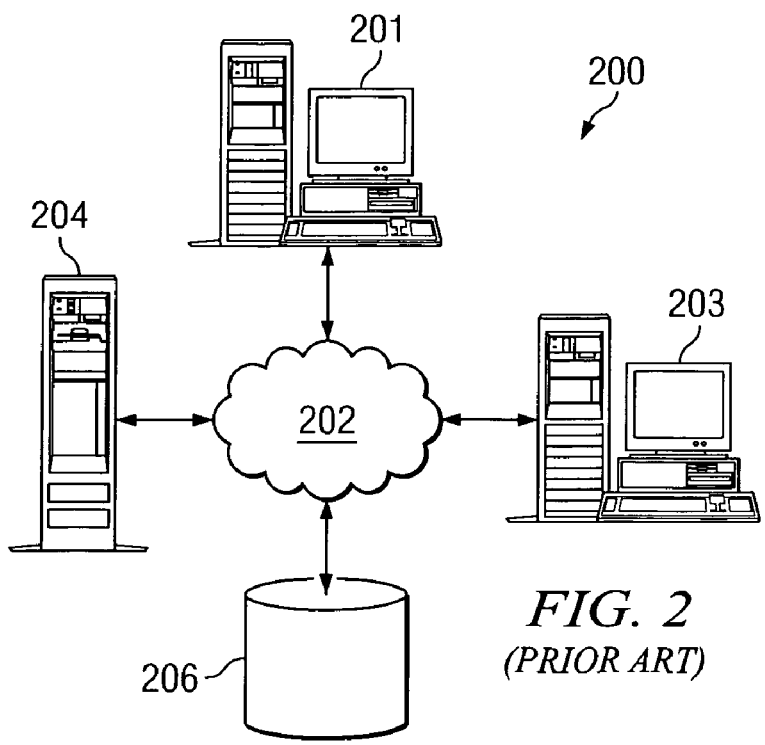
FIG. 2 illustrates a prior art architecture for connecting various hardware devices to create a network for transferring data.

FIG. 2 illustrates a common prior art architecture for connecting various hardware devices to create a network for transferring data. Computer network 200 comprises local workstation 201 electrically coupled to network connection 202. In FIG. 2, local workstation 201 is coupled electrically to remote workstation 203 via network connection 202. Local workstation 201 also is coupled electrically to server 204 and persistent storage 206 via network connection 202. Network connection 202 may be a simple local area network (LAN) or may be a larger wide area network (WAN), such as the Internet. While computer network 200 depicted in FIG. 2 is intended to represent an example of possible network architecture, it is not intended to represent an architectural limitation.

In order to enable a user to choose locations in other applications to receive segments, and to mark segments for manual or automatic transmission to those applications, SIP 180 employs the combination of Application Interface Program (AIP) 110, Segment Creator Program (SCP) 120, Segment Queue Program (SQP) 130, and Segment Delivery Program (SDP) 140.

FIG. 3 depicts a flow chart of the logic of the AIP 110. AIP 110 starts (302) and the user selects an application (310). AIP 110 enables a user to select a location in an application and assigns an application code and a location code to the location. AIP 110 assigns a user code (312) and assigns an application code (314). The user then reviews the application pages (316). If the user wants to select a location (318) in the application for receiving data in a segment, then the user highlights the location (320). When the location is highlighted AIP 110 assigns a location code to the highlighted location (322). If the user did not want to select a location at step 318, then AIP 110 would stop (340). A determination is made whether the user wants to choose a display (324). If so, the user views the display options (326), and selects and configures the display (328). AIP assigns the display to the location code (330). A determination is made whether the user wants to highlight another location (332). If so, AIP 110 goes to step 318. If not, AIP 110 determines whether the user wants to review another application (334). If so, AIP 110 goes to step 310. If not, AIP 110 stops (340).

FIG. 4 depicts a flow chart of the logic of SCP 120. SCP 120 enables a user to select a segment in a chat transcript, assign an application code and a location code to the segment, and send the segment to SQP 130. SCP 120 starts (402) and the user reviews an IM (410). If the user wants to post a segment from the IM to an application (412), then the user highlights the segment (414). The user selects the application (416), and SCP 120 inserts the application code (418). The user selects the location (420) and SCP 120 inserts the location code (422). SCP 120 sends the segment to SQP 130. If there is another segment to be created, SCP 120 goes to step 414. If not, and if the user wants to review another IM, the application goes to step 410, otherwise SCP 120 stops (430).

Figure 5:
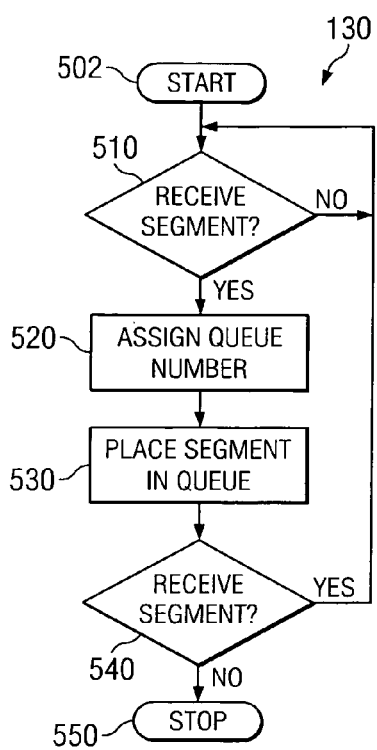
FIG. 5 provides a flowchart of the Segment Queue Program (SQP)

FIG. 5 depicts a flowchart of the logic of SQP 130. SQP 130 starts (502) and determines whether a segment has been received (510). If a segment has been received, a queue number is assigned to the segment (520). The segment is placed in the queue (530) and, if there is another segment (540), SQP 130 goes to step 510. If not, SQP 550 stops.

Figure 6:
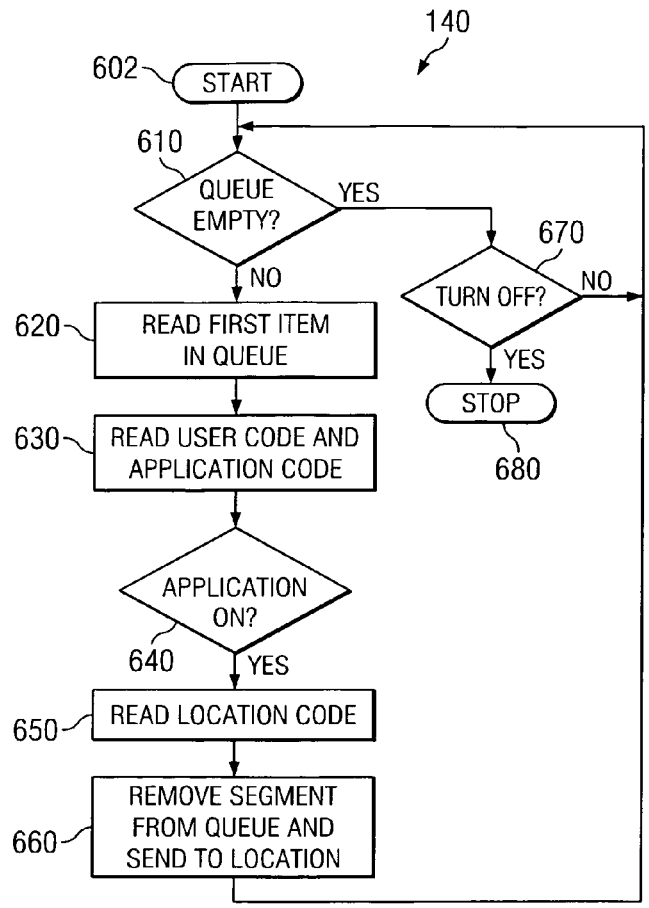
FIG. 6 provides a flowchart of the Segment Delivery Program (SDP)

FIG. 6 depicts the logic of SDP 140. SDP 140 reads the user code, the application code and, when the application is active, sends the segment to the location in the application with the corresponding code. SDP 602 starts (602). If the queue has at least one segment (610), then SDP 140 reads the first item in the queue (620). SDP 140 reads the user code and the application code for the first item in the queue (630). SDP 140 determines whether the application corresponding to the user code and the application code is running (640), and if so, SDP 140 reads the location code (650). SDP 140 removes the segment from the queue, sends the segment to the location in the application corresponding to the location, and returns to step 610. If at step 640, the application is not running, the segment may be given a new queue number and sent to the end of the queue, or the segment may be sent to an interim file. Alternatively, a message may be sent to the application to prompt the application to request the segment when the application is activated. If at step 610 the queue is empty, SDP 140 determines whether to continue or stop (680).

Figure 7A:
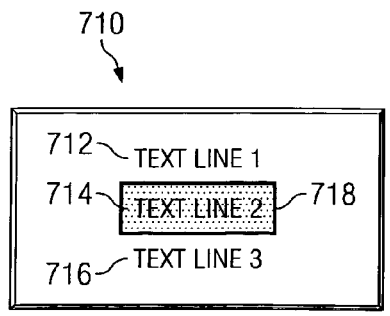
FIG. 7A illustrates exemplary multiple text lines.

FIG. 7A depicts example IM transcript 710 having three lines of text. In the example, text line 2 714 is shown with highlighting 718 by a user. Since text line 2 714 has been selected by a user by highlighting, it will appear in segment display window 780 of second graphical user interface 760 (see FIG. 7C).

Figure 7B:
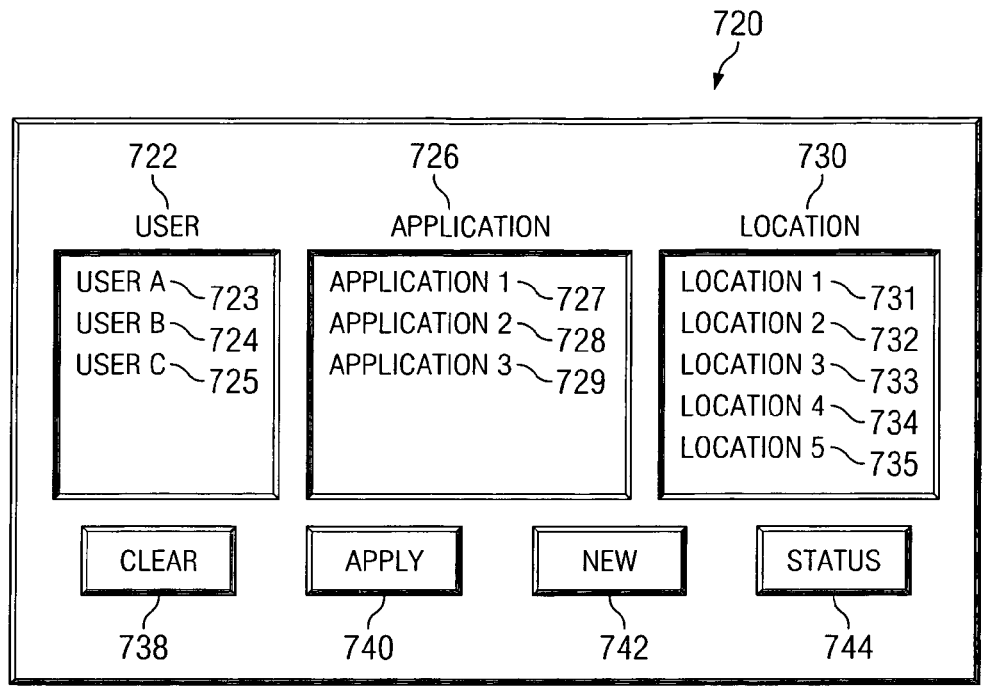
FIG. 7B illustrates a first graphical user interface (GUI) for identifying segments.

FIG. 7B depicts first graphical user interface 720 which is presented by AIP 110 to the user so that the user can identify locations in an application display to receive designated and coded segments of chat transcripts. The user reviews the application and selects the location to receive designated chat segments. When a location is highlighted, the user selects a user designation from user window 722, an application designation from application window 726 and a location from window 730. When ready, the user activates apply button 740, and the codes to the selections are applied to the application locations.

Figure 7C:
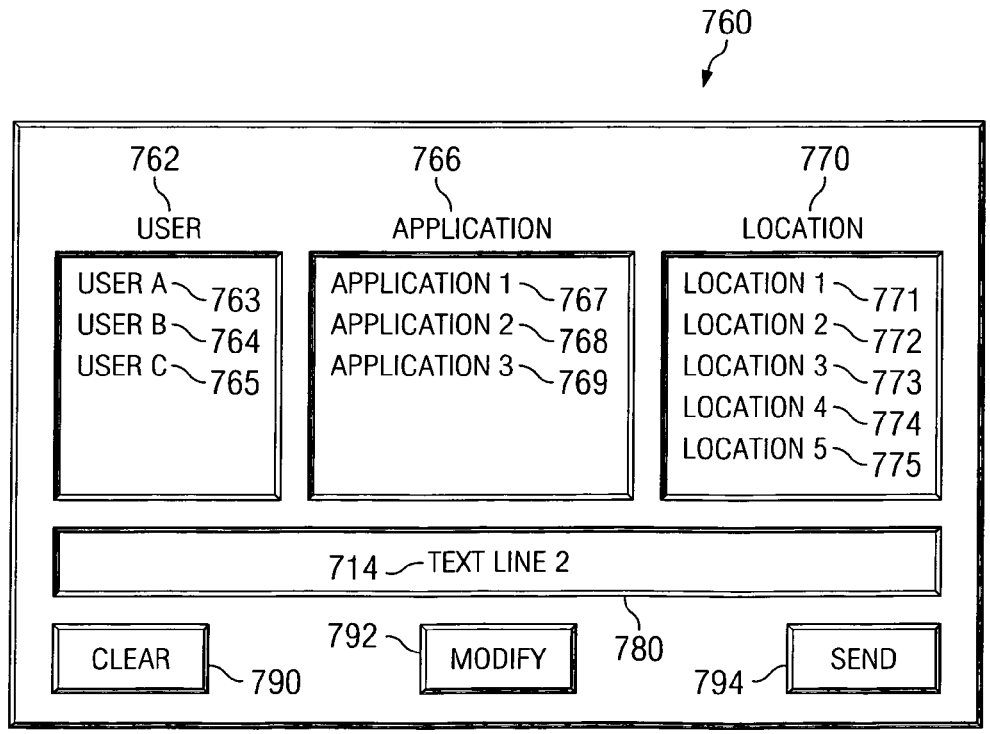
FIG. 7C illustrates a second graphical user interface (GUI) for designating locations.

FIG. 7C depicts second graphical user interface 760 which appears when the user desires to select a segment for transmission to a selected location in an application. Text window 780 displays text line 2. Text line 2 is shown as having been highlighted by the user in the IM transcript 710 (See FIG. 7A), and since it has been highlighted in the transcript, it appears in segment window 714 of second graphical user interface 760. Modify button 792 allows the user to modify the text selected from the IM window. When the segment is ready for transmission, the user selects the appropriate user from user window 762, application from application window 766 and location from location window 770. The selections from these windows apply the corresponding codes to the segment when the segment is sent. Clear button 790 allows the user to remove all selections and start over. Send button 794 is used by the user to send the text to the application location that has been selected.

FIG. 8A depicts a table showing the codes for the applications and locations. Code table 800 stores codes for each application in column 810 and each location type in column 820. Code table 800 may be stored in codes database 160 (see FIG. 1).

FIG. 8B depicts a table showing all of the instances for each location type within an application for a user. Table 840 stores instances for each application location for User A. In other words, a segment may be posted to more than one location type within an application display.

FIG. 9 depicts queue table 900. Queue table 900 stores all chat segments with each segments attached user, application, and location codes. Each chat segment has a queue number assigned and the segments are stored in the order of the assigned queue number. For example, queue table 900 shows received text in column 950, application code in column 930, location code in column 940, user code in column 920, and sequence number in column 910.

Persons skilled in the art are aware of many different ways in which the segment interface program may be configured and employed. For example, FIG. 7B and FIG. 7C depicted one possible manner of providing a graphical user interface. FIG. 7B and FIG. 7C may be combined in one GUI by adding a button so that the user can select the function for which the GUI will employed. Other additional aids to the user can be provided to assist the user in selecting a chat segment. For example, a set of buttons could be displayed along the side of the chat segment so that user could activate the buttons by clicking, highlighting, or passing the cursor over the selected button. The buttons could represent one turn, a series of turns or an entire chat transcript. Moreover, the buttons could be configured to work with topics, names, timestamp, and so on. A transcript map could be depicted next to the chat transcript so that the user could select a segment by selecting a region on the segment map.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method comprising:
a computer displaying an instant messaging chat transcript;
the computer receiving a first segment of text displayed within the instant messaging chat transcript, an identifier of a first application, an identifier of a user of the first application, and an identifier of a location at which to receive the first segment of text in a first application display;
the computer assigning a first queue number to the first segment of text;
the computer inserting, into a table, the first queue number, the first segment of text, the identifier of the first application, the identifier of the user of the first application, and the identifier of the location at which to receive the first segment of text in a first application display; and
the computer determining that an instance of the first application corresponding to the identifier of the first application and the identifier of the user of the first application is started, and in response, the computer removing the first segment of text from the table and the computer sending the first segment of text to a location within a display of the instance of the first application corresponding to the location at which to receive the first segment of text in a first application display.

2. The method of claim 1, further comprising:
the computer receiving a second segment of text displayed within the instant messaging transcript, an identifier of a second application, an identifier of a user of the second application, and an identifier of a location at which to receive the second segment of text in a second application display;
the computer assigning a second queue number to the second segment of text;
the computer inserting, into the table, the second queue number, the second segment of text, the identifier of the second application, the identifier of the user of the second application, and the identifier of the location at which to receive the second segment of text in a second application display; and
the computer determining that an instance of the second application corresponding to the identifier of the second application and the identifier of the user of the second application is not started, and in response, the computer assigning a new queue number to the second segment of text and the computer inserting the second segment of text at an end of the table, wherein the table is ordered according to queue numbers of segments of texts of the instant messaging chat transcript.

3. The method of claim 1, wherein the location within the display of the instance of the first application is a configurable space.

4. A computer system comprising one or more processors, one or more computer-readable memories, one or more computer-readable tangible storage devices, and program instructions which are stored on at least one of the one or more storage devices for execution by at least one of the one or more processors via at least one of the one or more memories and when executed by at least one of the one or more processors perform the method of claim 1.

5. A computer program product comprising one or more computer-readable tangible storage devices and computer-readable program instructions which are stored on at least one of the one or more storage devices and when executed by one or more processors, perform the method of claim 1.

6. A computer system comprising:
one or more processors, one or more computer-readable memories and one or more computer-readable tangible storage devices;
program instructions, stored on at least one of the one or more computer-readable tangible storage devices for execution by at least one of the one or more processors via at least one of the one or more memories, to display an instant messaging chat transcript;
program instructions, stored on at least one of the one or more computer-readable tangible storage devices for execution by at least one of the one or more processors via at least one of the one or more memories, to receive a first segment of text displayed within the instant messaging chat transcript, an identifier of an application, an identifier of a user of the application, and an identifier of a location at which to receive the first segment of text in an application display;
program instructions, stored on at least one of the one or more computer-readable tangible storage devices for execution by at least one of the one or more processors via at least one of the one or more memories, to assign a first queue number to the first segment of text;
program instructions, stored on at least one of the one or more computer-readable tangible storage devices for execution by at least one of the one or more processors via at least one of the one or more memories, to insert, into a table, the first queue number, the first segment of text, the identifier of the application, the identifier of the user of the application, and the identifier of the location at which to receive the first segment of text in an application display;
program instructions, stored on at least one of the one or more computer-readable tangible storage devices for execution by at least one of the one or more processors via at least one of the one or more memories, to determine that an instance of the application corresponding to the identifier of the application and the identifier of the user of the application is started, and in response, to remove the first segment of text from the table and to send the first segment of text to a location within a display of the instance of the application corresponding to the location at which to receive the first segment of text in an application display;
program instructions, stored on at least one of the one or more computer-readable tangible storage devices for execution by at least one of the one or more processors via at least one of the one or more memories, to receive a second segment of text displayed within the instant messaging chat transcript, the identifier of the application, the identifier of the user of the application, and an identifier of a location at which to receive the second segment of text in an application display;

program instructions, stored on at least one of the one or more computer-readable tangible storage devices for execution by at least one of the one or more processors via at least one of the one or more memories, to assign a second queue number to the second segment of text;

program instructions, stored on at least one of the one or more computer-readable tangible storage devices for execution by at least one of the one or more processors via at least one of the one or more memories, to insert, into the table, the second queue number, the second segment of text, the identifier of the application, the identifier of the user of the application, and the identifier of the location at which to receive the second segment of text in an application display; and program instructions, stored on at least one of the one or more computer-readable tangible storage devices for execution by at least one of the one or more processors via at least one of the one or more memories, to determine that the instance of the application corresponding to the identifier of the application and the identifier of the user of the application is not started, and in response, to assign a new queue number to the second segment of text and to insert the second segment of text at an end of the table, wherein the table is ordered according to queue numbers of segments of texts of the instant messaging chat transcript.

7. The computer system of claim 6 wherein the location within the display of the instance of the first application is a configurable space.

8. A computer program product comprising:
one or more computer-readable tangible storage devices;
program instructions, stored on at least one of the one or more computer-readable tangible storage devices, to display an instant messaging chat transcript;
program instructions, stored on at least one of the one or more computer-readable tangible storage devices, to receive a segment of text displayed within the instant messaging chat transcript, an identifier of an application, an identifier of a user of the application, and an identifier of a location at which to receive the segment of text in an application display;
program instructions, stored on at least one of the one or more computer-readable tangible storage devices, to assign a queue number to the segment of text;
program instructions, stored on at least one of the one or more computer-readable tangible storage devices, to insert, into a table, the segment of text, the identifier of the application, the identifier of the user of the application, and the identifier of the location at which to receive the segment of text in an application display;
program instructions, stored on at least one of the one or more computer-readable tangible storage devices, to determine that an instance of the application corresponding to the identifier of the application and the identifier of the user of the application is started, and in response, to remove the segment of text from the table and to send the segment of text to a location within a display of the instance of the application corresponding to the location at which to receive the segment of text in an application display; and
program instructions, stored on at least one of the one or more computer-readable tangible storage devices, to determine that the instance of the application corresponding to the identifier of the application and the identifier of the user of the application is not started, and in response, to assign a new queue number to the segment of text and to insert the segment of text at an end of the table, wherein the table is ordered according to queue numbers of segments of texts of the instant messaging chat transcript.

9. The computer program product of claim 4 wherein the location within the display of the instance of the application is a configurable space.

* * * * *